US011766788B2

(12) United States Patent
Zhang et al.

(10) Patent No.: US 11,766,788 B2
(45) Date of Patent: Sep. 26, 2023

(54) INSPECTION ROBOT AND INSPECTION METHOD

(71) Applicant: SHENZHEN YOUIBOT ROBOTICS CO., LTD., Guangdong (CN)

(72) Inventors: Zhaohui Zhang, Shenzhen (CN); Xu Bian, Shenzhen (CN); Jin Xu, Shenzhen (CN); Wanqiu Zhao, Shenzhen (CN); Xuesong Mei, Shenzhen (CN)

(73) Assignee: SHENZHEN YOUIBOT ROBOTICS CO., LTD., Shenzhen (CN)

( * ) Notice: Subject to any disclaimer, the term of this patent is extended or adjusted under 35 U.S.C. 154(b) by 572 days.

(21) Appl. No.: 16/962,628

(22) PCT Filed: Jan. 17, 2019

(86) PCT No.: PCT/CN2019/072184
§ 371 (c)(1),
(2) Date: Jul. 16, 2020

(87) PCT Pub. No.: WO2019/144837
PCT Pub. Date: Aug. 1, 2019

(65) Prior Publication Data
US 2020/0346355 A1    Nov. 5, 2020

(30) Foreign Application Priority Data

Jan. 29, 2018   (CN) .......................... 201810084333.5

(51) Int. Cl.
*B25J 15/00*    (2006.01)
*B25J 19/02*    (2006.01)
(Continued)

(52) U.S. Cl.
CPC ............. *B25J 19/022* (2013.01); *B25J 5/007* (2013.01); *B25J 15/0019* (2013.01); *B25J 19/002* (2013.01)

(58) Field of Classification Search
CPC ...... B25J 19/002; B25J 15/0019; B25J 5/007; B25J 9/046; B25J 19/022
See application file for complete search history.

(56) References Cited

U.S. PATENT DOCUMENTS 8,627,780 B2 * 1/2014 Herre ...................... B05B 16/40
                                                    118/698
9,889,562 B1    2/2018 Rembisz
(Continued)

FOREIGN PATENT DOCUMENTS

CN   101604825 A   12/2009
CN   105415380 A    3/2016
(Continued)

OTHER PUBLICATIONS

Bomfim et al., Overhauling of a ASEA Robot IR6 with Open Architecture, 2012, IEEE, p. 482-489 (Year: 2012).*
(Continued)

*Primary Examiner* — McDieunel Marc
(74) *Attorney, Agent, or Firm* — Maschoff Brennan

(57) ABSTRACT

An inspection robot comprises a control cabinet, an actuator, and a base. The control cabinet and the actuator are oppositely arranged on the base in a direction parallel to a plane where the base is located. The control cabinet is configured to control a path of movement of the actuator. The actuator and the control cabinet are both installed on the same panel of the base, so that the load is more uniformly distributed on the base. Also provided is an inspection method.

19 Claims, 4 Drawing Sheets

(51) Int. Cl.
    *B25J 5/00*         (2006.01)
    *B25J 19/00*      (2006.01)

(56)           References Cited

U.S. PATENT DOCUMENTS

| | | | |
|---|---|---|---|
| 10,052,767 B2* | 8/2018 | Maruyama | B25J 21/00 |
| 10,597,235 B2* | 3/2020 | Clucas | B65G 67/02 |
| 10,598,479 B2* | 3/2020 | Becker | G01B 11/005 |
| 10,635,758 B2* | 4/2020 | Pivac | B25J 9/1638 |
| 11,477,993 B2* | 10/2022 | Irwin | B65B 25/007 |
| 11,485,018 B2* | 11/2022 | Troy | B25J 9/1684 |
| 2013/0231779 A1* | 9/2013 | Purkayastha | G05D 1/0088 |
| | | | 700/258 |
| 2019/0084769 A1* | 3/2019 | Clucas | B65G 47/244 |
| 2020/0172341 A1* | 6/2020 | Clucas | B65G 67/02 |

FOREIGN PATENT DOCUMENTS

| | | | |
|---|---|---|---|
| CN | 106002924 A | 10/2016 | |
| CN | 107264551 A | 10/2017 | |

OTHER PUBLICATIONS

Bomfim et al., Methodology for remanufacturing of industrial robotic manipulators using open control architecture, 2013, IEEE, p. 47-52 (Year: 2013).*
Pouliot et al., Reliable and intuitive teleoperation of LineScout: a mobile robot for live transmission line maintenance, 2009, IEEE, p. 1703-1710 (Year: 2009).*
Spencer et al., A robotic system for inspecting HEPA filters in a large cleanroom facility at the NASA Kennedy Space Center, 2002, IEEE, p. 2578-2583 (Year: 1994).*

* cited by examiner

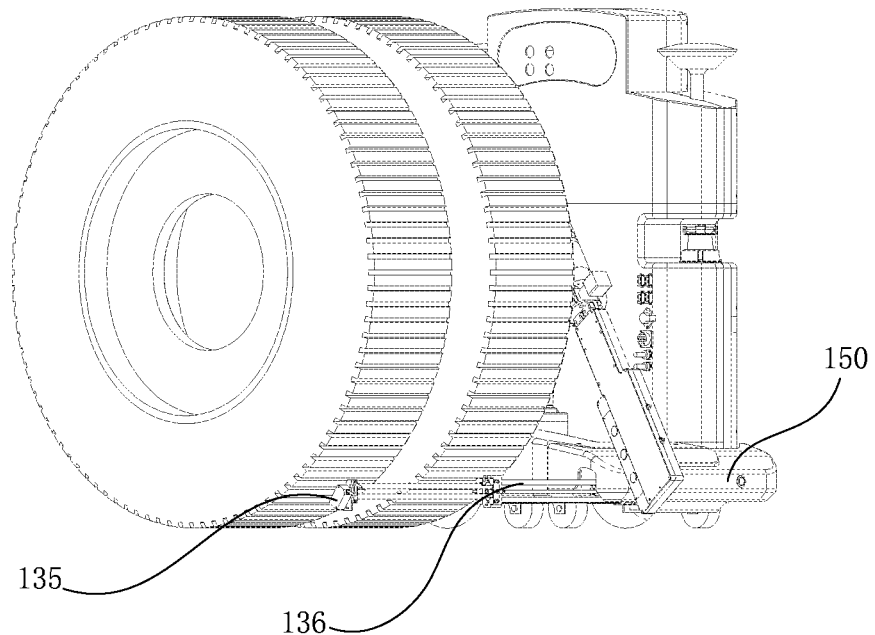

FIG. 5

| An actuator moving to a detection area according to a control signal from a control cabinet and performing detection on an object to be detected arranged in the detection area | S101 |

FIG. 6

| Moving a position of the robotic arm according to the control signal from the control cabinet, wherein the positional movement comprises a linear extension or retraction movement of the robotic arm, and/or a movement of the robotic arm in a direction of each of multiple degrees of freedom | S1011 |

FIG. 7

| The detection sensor detecting the object to be detected and sending a detection signal to the control cabinet | S1012 |

FIG. 8

Adjusting a length of extension or retraction of the extendable rod according to a preset signal; and the laser-based wear detection sensor detecting an object to be detected and sending a laser-based wear detection signal to the control cabinet — S102

FIG. 9

Controlling an operation of the electric motor to drive the travelling wheel set to rotate — S1011'

FIG. 10

INSPECTION ROBOT AND INSPECTION METHOD

CROSS-REFERENCE TO RELATED APPLICATIONS

The present disclosure claims priority of Chinese Patent Application No. 201810084333.5, filed with the Chinese Patent Office (CNIPA) on Jan. 29, 2018, entitled "Inspection Robot", the contents of which are incorporated herein by reference in their entirety.

TECHNICAL FIELD

The present disclosure relates to the technical field of robots, and in particular to an inspection robot and an inspection method.

BACKGROUND ART

With the continuous development of science and technology, carrying out various operations and tasks by robots instead of by manual labor has become an inevitable trend. Robots can perform dangerous and highly repeatable checking tasks and have features of accurate checking, prolonged working time, safety and high efficiency, and low cost. However, the prior art inspection robots operate at very limited positions and cannot perform stable inspection processes.

SUMMARY

An objective of the present disclosure is to provide an inspection method and an inspection robot, which can operate at more selectable positions and operate more stably.

Embodiments of the present disclosure are implemented as follows:

In an embodiment of the present disclosure, an inspection robot is disclosed, including a control cabinet, an actuator, and a base, wherein the control cabinet and the actuator are oppositely arranged on the base in a direction parallel to a plane where the base is located. The control cabinet is configured to control a path of movement of the actuator.

In an embodiment of the present disclosure, the actuator and the control cabinet are respectively located on the two sides of a travelling direction of the inspection robot.

In an embodiment of the present disclosure, the actuator includes a robotic arm and a detection sensor. The robotic arm has one end connected with the base and the other end extendably connected with the detection sensor, and the robotic arm and the detection sensor are in signal connection with the control cabinet, respectively.

In an embodiment of the present disclosure, the robotic arm is an extendable arm, and the robotic arm is linearly extended or retracted in a direction, in which the two ends of the robotic arm are connected, according to a control signal from the control cabinet.

In an embodiment of the present disclosure, the said other end of the robotic arm is connected with the detection sensor via an extendable member, and the extendable member is in signal connection with the control cabinet.

In an embodiment of the present disclosure, the robotic arm has six degrees of freedom.

In an embodiment of the present disclosure, the base is further provided with a laser-based wear detection sensor, wherein the laser-based wear detection sensor is connected with the base by means of an extendable rod, and the extendable rod and the laser-based wear detection sensor are in signal connection with the control cabinet, respectively.

In an embodiment of the present disclosure, the base is provided with a travelling wheel set and an electric motor, wherein the electric motor is in signal connection with the control cabinet and configured to drive the travelling wheel set to rotate according to a control signal from the control cabinet.

In an embodiment of the present disclosure, the travelling wheel set includes driving wheels and driven wheels, wherein the electric motor is configured to drive the driving wheel to rotate, and the driven wheels are universal wheels.

In an embodiment of the present disclosure, a clump weight is arranged between each driven wheel and a connection plate of the base.

In an embodiment of the present disclosure, elastic members are further arranged between the travelling wheel set and the base.

In an embodiment of the present disclosure, the control cabinet is detachably connected with the base.

In an embodiment of the present disclosure, the control cabinet is connected with the base via a support column. The support column has an end provided with a first threaded hole and the other end provided with a second threaded hole, respectively. The first threaded hole is threaded to match a first bolt of the control cabinet, and the second threaded hole is threaded to match a second bolt of the base.

In an embodiment of the present disclosure, an inspection method is disclosed, including steps of: an actuator moving to a detection area according to a control signal from a control cabinet and performing detection on an object to be detected arranged in the detection area.

In another embodiment of the present disclosure, the actuator includes a robotic arm and a detection sensor, and the step of the actuator moving to a detection area according to a control signal from a control cabinet includes: moving a position of the robotic arm according to the control signal from the control cabinet, wherein the positional movement includes a linear extension or retraction movement of the robotic arm, and/or a movement of the robotic arm in a direction of each of multiple degrees of freedom. The step of performing detection on an object to be detected arranged in the detection area includes: the detection sensor detecting the object to be detected and sending a detection signal to the control cabinet.

In another embodiment of the present disclosure, a base is further provided with a laser-based wear detection sensor, the laser-based wear detection sensor is connected with the base via an extendable rod, and the method further includes: adjusting a length of extension or retraction of the extendable rod according to a preset signal, and the laser-based wear detection sensor detecting an object to be detected and sending a laser-based wear detection signal to the control cabinet.

In another embodiment of the present disclosure, the base is provided with a travelling wheel set and an electric motor, and the step of the actuator moving to a detection area according to a control signal from the control cabinet further includes:

controlling an operation of the electric motor to drive rolling of the travelling wheel set.

The embodiments of the present disclosure have at least the following advantages or advantageous effects:

An embodiment of the present disclosure provides an inspection robot, which mainly includes a control cabinet, an actuator, and a base, and which can be used in various occasions, for example, for inspection in a power station, inspection in a chemical plant, detection of vehicles, etc. The control cabinet is configured to control a path of movement of the actuator, so that the actuator can inspect according to the preset path to find out the operation conditions of various places. Here, the control cabinet and the actuator are oppositely arranged on the base in a direction parallel to a plane where the base is located. In other words, the actuator and the control cabinet are both installed on the same panel of the base. Their specific positions on the panel may be selected according to the specific situation, as long as the load can be more uniformly distributed on the base. Upon the load is distributed on the base with improved uniformity, the overall balance of the inspection robot can be improved, thereby reducing the possibility of tumbling of the inspection robot during operation and improving the operation stability of the inspection robot. Since the actuator is directly installed on the base, the center of gravity of the actuator is greatly reduced, and the balance of the inspection robot is much less affected when the actuator is moving. The actuator is installed at a lower position, thus the actuator can operate in a space closer to the ground, and the effective operation space of the inspection robot is greatly increased, so that more comprehensive and accurate detection results are obtained by the inspection robot.

BRIEF DESCRIPTION OF DRAWINGS

In order to more clearly illustrate technical solutions of embodiments of the present disclosure, drawings required for use in the embodiments will be described briefly below. It is to be understood that the drawings below are merely illustrative of some embodiments of the present disclosure, and therefore should not be considered as limitations on its scope. It will be understood by those of ordinary skill in the art that other relevant drawings can also be obtained from these drawings without any inventive effort.

FIG. 5 is a second structural schematic view of an inspection robot according to an embodiment of the present disclosure;

FIG. 6 is a first flowchart of an inspection method according to an embodiment of the present disclosure;

FIG. 7 is a second flowchart of an inspection method according to an embodiment of the present disclosure;

FIG. 8 is a third flowchart of an inspection method according to an embodiment of the present disclosure;

FIG. 9 is a fourth flowchart of an inspection method according to an embodiment of the present disclosure; and FIG. 10 is a fifth flowchart of an inspection method according to an embodiment of the present disclosure.

Figure 1:
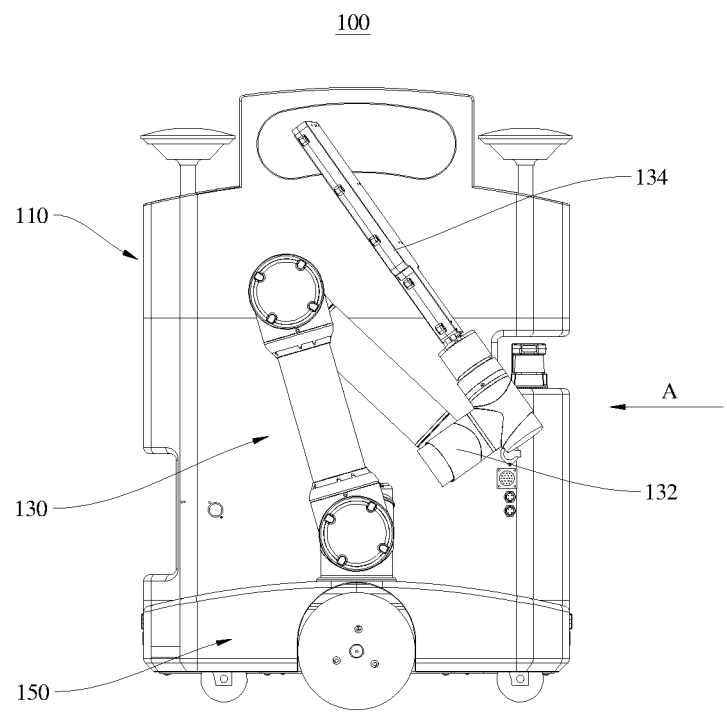
FIG. 1 is a first structural schematic view of an inspection robot according to an embodiment of the present disclosure.

Reference Numerals: 100—inspection robot; 110—control cabinet; 130—actuator; 132—robotic arm; 134—detection sensor; 135—laser-based wear detection sensor; 136—extendable rod; 150—base; 152—travelling wheel set; 154—driving wheel; 156—driven wheel; 158—bolt; 160—connection plate.

DETAILED DESCRIPTION OF EMBODIMENTS

In order to further clarify the objectives, technical solutions, and advantages of the embodiments of the present disclosure, the technical solutions of the embodiments of the present disclosure will be described below clearly and completely with reference to the drawings of the embodiments of the present disclosure. It is apparent that the embodiments to be described are some, but not all of the embodiments of the present disclosure. Generally, the components of the embodiments of the present disclosure, as described and illustrated in the figures herein, may be arranged and designed in a wide variety of different configurations.

Thus, the following detailed description of the embodiments of the present disclosure, as represented in the figures, is not intended to limit the scope of the present disclosure as claimed, but is merely representative of selected embodiments of the present disclosure. All the other embodiments obtained by those of ordinary skill in the art in light of the embodiments of the present disclosure without inventive efforts will fall within the scope of the present disclosure as claimed.

It should be noted that similar reference numerals and letters refer to similar items in the following figures, and thus once an item is defined in one figure, it may not be further defined or explained in the following figures.

In the description of the embodiments of the present disclosure, it should be noted that orientation or positional relationships indicated by the terms such as "up", "down", "left", and "right", if present, are the orientation or positional relationships shown based on the figures, or the orientation or positional relationships in which the inventive product is conventionally placed in use, and these terms are intended only to facilitate the description of the present disclosure and simplify the description, but not intended to indicate or imply that the referred devices or elements must be in a particular orientation or constructed or operated in the particular orientation, and therefore should not be construed as limiting the present disclosure. In addition, terms such as "first" and "second" are used for distinguishing the description only, and should not be understood as an indication or implication of relative importance.

In addition, the term "parallel" or "horizontal", if present, does not mean that a component is required to be absolutely parallel or horizontal, but means that the component may be slightly inclined.

In the description of the embodiments of the present disclosure, it should also be noted that terms "arrange", "install", "couple", and "connect", if present, should be understood broadly unless otherwise expressly specified or defined. For example, connection may be fixed connection or detachable connection or integral connection, may be mechanical connection or electric connection, or may be direct coupling or indirect coupling via an intermediate medium or internal communication between two elements. The specific meanings of the above-mentioned terms in the present disclosure can be understood by those of ordinary skill in the art according to specific situations.

Referring to FIG. 1, FIG. 1 shows a schematic structural view of an inspection robot 100. In this embodiment, an inspection robot 100 is provided, which can be applied in various occasions, for example, for inspection in a power station, inspection of rails, inspection in a chemical plants, inspection of tires, etc. The occasions to which the inspection robot 100 is applicable are not specifically limited in the embodiment of the present disclosure.

Figure 2:
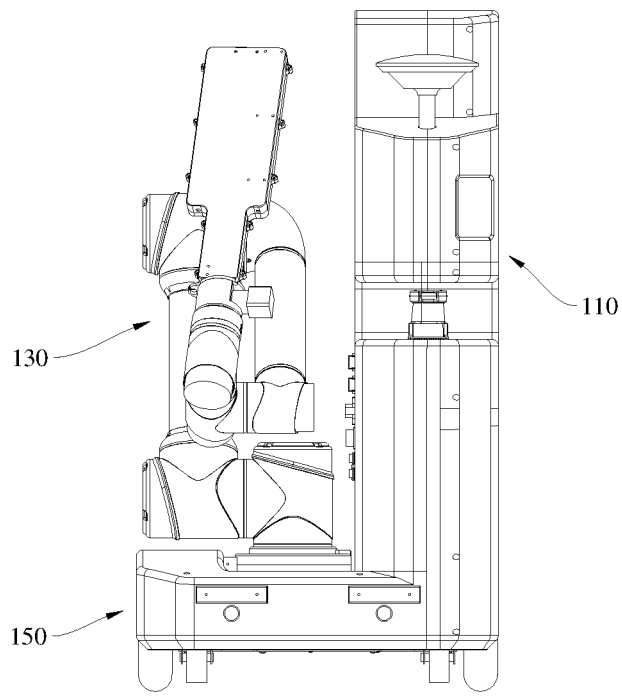
FIG. 2 is a view from direction A of FIG. 1.

The inspection robot 100 of the embodiment of the present disclosure mainly includes a control cabinet 110, an actuator 130, and a base 150. The control cabinet 110 and the actuator 130 are both installed on the base 150. With further reference to FIG. 2, FIG. 2 shows a view from direction A of FIG. 1. Exemplarily, as shown in FIG. 2, the control cabinet 110 and the actuator 130 are oppositely arranged on the base 150 in a direction parallel to a plane where the base 150 is located, and they correspond to each other in the horizontal direction. Under this arrangement, the actuator 130 and the control cabinet 110 are located on the left and right sides of the same panel of the base 150, respectively. It should be noted that the left and right sides are described only based on the case shown in FIG. 2. From other angles of view, it may be considered that the actuator 130 and the control cabinet 110 are in a front-to-rear arrangement and they are located at different positions on the panel of the base 150, as long as the purpose of keeping the inspection robot 100 in better balance is achieved.

In the above arrangement, the actuator 130 is installed at a lower position so that it has a lower center of gravity. When the actuator 130 is in movement for performing an inspection, the balance of the inspection robot 100 can be less affected, and the probability of tumbling or toppling of the inspection robot 100 can be reduced. Additionally, the actuator 130 is enabled to operate in a space closer to the ground, the effective operating space of the actuator 130 is increased, such that a detectable range of the actuator 130 is increased, and thus the accuracy and effectiveness of the inspection results obtained are improved. In the current conventional inspection robot, the part of actuator is generally installed above the control cabinet, so that the distance between the actuator and the ground is larger, the actuator is not allowed to operate at a position closer to the ground, and thus the actuator has a greatly reduced ability to operate near the ground. As a result, there are large blind spots that cannot be inspected by conventional inspection robots, and the inspection results are obtained with much less reliability.

In the above arrangement, the uniformity of the load on the base 150 is improved by distributing the actuator 130 and the control cabinet 110 in a left-to-right manner, so that the overall balance of the inspection robot 100 is improved, and the probability of tumbling of the inspection robot 100 during operation is further reduced. The control cabinet 110 can serve the function of balancing the center of gravity of the inspection robot 100. The control cabinet 110 is configured mainly to control the movement path (i.e., detection path) of the actuator 130. When the actuator 130 is extended by a long distance during inspection, the inspection robot 100 can be kept stable under the action of the control cabinet 110, and thus the operation stability of the inspection robot 100 is improved.

With reference to FIG. 1 again, in this embodiment, the actuator 130 further includes a robotic arm 132 and a detection sensor 134. The robotic arm 132 has one end connected with the base 150 and the other end extendably connected with the detection sensor 134. The robotic arm 132 and the detection sensor 134 are in signal connection with the control cabinet 110, respectively.

In this way, the robotic arm 132 can also perform an extension or retraction movement in its length direction so as to increase the range of positions detectable by the detection sensor 134. The detection sensor 134 and the robotic arm 132 are in signal connection with the control cabinet 110, respectively, a signal obtained by detecting an object to be detected by the detection sensor 134 may be transmitted to the control cabinet 110, and the control cabinet 110 can also control the extension or retraction of the robotic arm 132 according to a preset program or an specified program.

As shown in FIG. 1, the robotic arm 132 has one end connected with the base 150, and the other end extendably (retractably) connected with the detection sensor 134. The detection sensor 134 is extendably movable relative to the robotic arm 132. Exemplarily, the robotic arm 132 is an extendable arm, and according to a control signal from the control cabinet 110, the robotic arm 132 is linearly extended or retracted in a direction in which the two ends of the robotic arm 132 are connected. For example, the robotic arm 132 may have a telescopic extendable structure, or any other structure that is linearly extendable in a direction in which the two ends thereof are connected.

For another example, the end of the robotic arm 132 is connected with the detection sensor 134 via an extendable member (not shown in FIG. 1) which is in signal connection with the control cabinet 110. Similarly, the robotic arm 132 can extendably adjust a detection position of the detection sensor 134 connected with the robotic arm 132, by the extendable member arranged at the end of the robotic arm 132 in addition to by its own movability. Moreover, the extendable member is in signal connection with the control cabinet 110, thus the extended or retracted state of the extendable member may also be controlled and adjusted by the control cabinet 110.

It should be noted that the above two ways of extendably adjusting the detection position of the detection sensor 134 are only given as examples. The two ways of extendably adjusting the detection sensor 134 may be freely selected by those skilled in the art when the inspection robot 100 of the embodiment of the present disclosure is utilized for inspection operations. In addition, other ways of adjusting the position to which the detection sensor 134 is to be extended or retracted may also be used, which are not specifically limited in this embodiment.

The control cabinet 110 controls the movement of the robotic arm 132, and the robotic arm 132 drives the detection sensor 134 to move to carry out the detection. The extendable connection of the detection sensor 134 further increases the detectable range and detection capability.

Exemplarily, the robotic arm 132 may be in threaded connection with the base 150 to facilitate replacement, installation, and detachment of the robotic arm 132.

The detection sensor 134 is configured to detect a specified place or a specified object. Different detection sensors 134, such as a temperature detection sensor, an air quality detection sensor, a liquid level detection sensor, a tire detection sensor, etc., may be used according to specific detection requirements. The number and selectable types of the detection sensors 134 are not specifically limited in the embodiment of the present disclosure, and may be selected and set by those skilled in the art according to the specific types and requirements of the objects to be detected.

It should be noted that the robotic arm 132 may be directly purchased commercially, and a suitable robotic arm 132 with a certain capability of adjusting its spatial position may be selected according to the specific detection requirements. In this embodiment, the robotic arm 132 has six degrees of freedom. In other words, the robotic arm 132 is movable and rotatable in the three directions of X, Y, and Z, respectively, to realize the adjustment of the spatial position, so that the robotic arm 132 has a high adjustability. The robotic arm 132 drives the detection sensor 134 to reach any specified position in the space to perform the detection according to requirements of the specific position to be detected. The installation position and the adjustability of the robotic arm 132 enables the detection sensor 134 to have larger effective operation space and to detect the specified position from more angles to obtain more comprehensive and accurate detection results.

Of course, the robotic arm 132 may be correspondingly provided with other numbers of degrees of freedom, such as two degrees of freedom, four degrees of freedom, or the like, according to specific detection requirements.

Exemplarily, as shown in FIG. 5, the base 150 is further provided with a laser-based wear detection sensor 135. The laser-based wear detection sensor 135 is connected with the base 150 via an extendable rod 136. The extendable rod 136 and the laser-based wear detection sensor 135 are in signal connection with the control cabinet 110, respectively.

In this way, as shown in FIG. 5, while the inspection robot 100 of the embodiment of the present disclosure is detecting an object to be detected using the detection sensor 134, the status of the wear of the surface of the object to be detected may also be detected by the laser-based wear detection sensor 135. The laser-based wear detection sensor 135 is connected with the base 150 by the extendable rod 136. The detection position of the laser-based wear detection sensor 135 can be adjusted by the extension or retraction movement of the extendable rod 136, thereby expanding a detectable area of the laser-based wear detection sensor 135. Moreover, the extendable rod 136 and the laser-based wear detection sensor 135 are in signal connection with the control cabinet 110, respectively. Thus, on the one hand, the extended or retracted state of the extendable rod 136 may be controlled and adjusted by the control cabinet 110. On the other hand, a wear status detection signal from the laser-based wear detection sensor 135 may be transmitted to the control cabinet 110, and the control cabinet 110 may also control, in a feedback manner, the adjustment state of the extendable rod 136 according to the wear state detection signal.

In the prior art inspection robot, the detection sensor 134 is generally fixed to a cradle head. The installation position of the detection sensor 134 is limited so that only some ideal larger space can be inspected, but some non-ideal space such as narrow and long channels cannot be well inspected. For example, when it is necessary to inspect the crown surface of a tire of a vehicle, detection with the conventional inspection robot not only takes a long time but also cannot reach many unreachable areas to be detected, and has low detection efficiency and low detection accuracy. When the inspection robot 100 according to the embodiment of the present disclosure is used for inspection, since the robotic arm 132 is adjustable over a large range, the range of positions reachable by the detection sensor 134 is greatly increased, the detection capability of the detection sensor 134 is improved, thus the detection sensor 134 may reach detection areas which are not reachable by the conventional inspection robot, and thus the accuracy of the inspection results is greatly improved. Additionally, since the detection sensor 134 and the control cabinet 110 are located on opposite sides, the robotic arm 132 is enabled to have a larger range of effective operation space, so that the robotic arm 132 can operate closer to the ground. With the arrangement of the extendable structure, the robotic arm 132 has a large extendable length. Moreover, if the vehicle itself has a smaller width, thus the inspection robot 100 may complete the detection of all the tires of the vehicle by travelling on only one side of the vehicle, whereby the detection efficiency of the inspection robot 100 is greatly improved. The laser-based wear detection sensor 135 and the extendable rod 136 connected thereto are arranged such that the laser-based wear detection sensor 135 may be accurately positioned to the position of each tire of the vehicle by the control cabinet 110. When the inspection robot stops aside the vehicle, the tire to be detected is identified and aligned by a detection signal from the laser-based wear detection sensor 135. Moreover, as shown in FIG. 5, the laser-based wear detection sensor 135 is arranged at a position such that the laser-based wear detection sensor 135 can be extended to and retracted from the lower side of the tire to be detected to measure and record data about the section of the entire tire surface, and the data is calculated in the control cabinet 110 to obtain the remaining tread depth of the tire to be detected, and it is determined, for example, whether the tire is eccentrically worn.

In this embodiment, the control cabinet 110 is detachably connected with the base 150 to facilitate the maintenance of the inspection robot 100.

Further, the control cabinet 110 is connected with the base 150 by a support column (not shown in the figure). The support column has an end provided with a first threaded hole and the other end provided with a second threaded hole. The first threaded hole is threaded to match a first bolt (not shown in the figure) on the control cabinet 110, and the second threaded hole is threaded to match a second bolt (not shown) on the base 150. The control cabinet 110 may be separated from the base 150 by detaching the support column.

The control cabinet 110 can preset a movement route for the robotic arm 132, so that the robotic arm 132 moves according to the preset route to achieve a desired detection effect. The control cabinet 110 may specifically control the components in the inspection robot 100 in a manner with reference to the control mode in the conventional inspection robots, which is not specifically limited in this embodiment.

Figure 3:
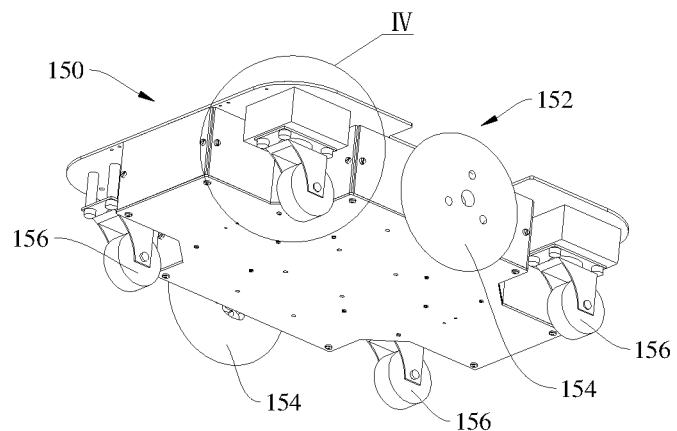
FIG. 3 is a schematic structural view of a base according to an embodiment of the present disclosure.

Referring to FIG. 3, FIG. 3 shows a schematic structural view of the base 150. The base 150 may be further provided with a travelling wheel set 152 and an electric motor (not shown in the figure). The electric motor is in signal connection with the control cabinet 110 and configured to drive a the travelling wheel set 152 to rotate according to a control signal from the control cabinet 110, so that the inspection robot 100 can automatically travel along a preset path under the control of the control signal preset in the control cabinet 110, and thus the inspection robot 100 is more automated.

Further, the travelling wheel set 152 includes driving wheels 154 and driven wheels 156, wherein the electric motor is configured to drive the driving wheels 154 to rotate, and the driven wheels 156 are a universal wheels. As shown in FIG. 3, in this embodiment, two driving wheels 154 and four driven wheels 156 are provided. The driving wheels 154 rotate forward to drive the driven wheels 156 to rotate forward. Universal wheels are selected and used as the driven wheels 156 so that the inspection robot 100 moves more flexibly. It can be seen with reference to FIG. 2 that, in this embodiment, the actuator 130 and the control cabinet 110 are located on the two sides of the inspection robot 100 in its travelling direction, respectively, which also allows a more effective working space during detection of tires of an automobile.

The driving wheels 154 are vertically movable in the height direction of the inspection robot 100, and the driven wheels 156 are also vertically movable in the height direction of the inspection robot 100.

Exemplarily, in this embodiment, the height of each of the driving wheels 154 may be automatically adjusted during travelling of the inspection robot 100, so that the inspection robot 100 is kept in good contact with the ground during travelling. The height of each of the driving wheels 154 may be adjusted autonomously by, for example, arranging an elastic member (e.g., a spring) between the driving wheel 154 and the base 150. Of course, a more complicated method such as electrical control may be used in other embodiments. In this embodiment, a change in the height of each of the driven wheels 156 is manually adjusted. This arrangement allows the height of the inspection robot 100 to be adjustable within a certain range and also allows the distance between the robotic arm 132 and the ground to be adjustable within a certain range, so that the robotic arm 132 can operate in more selectable spaces near the ground.

Figure 4:
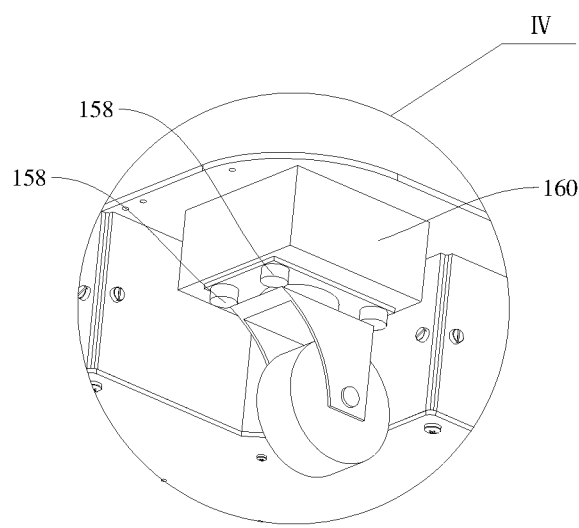
FIG. 4 is an enlarged schematic view of portion IV of FIG. 3.

Referring to FIG. 4, FIG. 4 shows an enlarged schematic view of portion IV of FIG. 3. The four driven wheels 156 may be connected with connection plates 160 on the base 150 by bolts 158. The height of the base 150 may be adjusted by adjusting the position at which each of the driven wheels 156 is fixed with the respective bolts 158.

Further, a clump weight (not shown in the figure) may be arranged between the driven wheel 156 and the connection plate 160. An effect of fixing the clump weight can be achieved by adjusting the position at which the driven wheel 156 is fixed with the bolts 158. The mass of the clump weight may be selected according to specific requirements. When it is necessary to greatly lower the center of gravity of the inspection robot 100, a clump weight with a larger mass may be selected. If there is a large difference in mass between the actuator 130 and the control cabinet 110 so that the load on the base 150 is not distributed uniformly, a clump weight or clump weights may be selectively mounted onto one or several of the driven wheels 156 according to the specific situation, so that the load on the base 150 is distributed more uniformly to improve the balancing capability of the inspection robot 100.

In this embodiment, other components of the inspection robot 100 are not described in more detail, and the structures of the other components that are not described may be understood with reference to commercially available inspection robots.

The inspection robot 100 operates based on the following principle.

This embodiment provides an inspection robot 100, which mainly includes a control cabinet 110, an actuator 130, and a base 150, and the inspection robot can perform inspection operations in various places and has significant advantages especially in the detection of the crown surfaces of tires of a vehicle.

The actuator 130 can operate in a space closer to the ground, whereby the effective operation space of the actuator 130 is increased, and the detectable range of the actuator 130 is increased, thereby the accuracy and effectiveness of the inspection results obtained are improved. The uniformity of the load on the base 150 is improved by distributing the actuator 130 and the control cabinet 110 in a left-to-right manner, so that the overall balance of the inspection robot 100 is improved, and the possibility of tumbling of the inspection robot 100 during operation is further reduced. The control cabinet 110 can serve the function of balancing the center of gravity of the inspection robot 100. The control cabinet 110 is configured mainly to control the movement path (i.e., detection path) of the actuator 130. When the actuator 130 is extended by a long distance during inspection, the inspection robot 100 can be kept stable under the action of the control cabinet 110, and thus the operation stability of the inspection robot 100 is improved. The installation position and the adjustability of the robotic arm 132 enable the detection sensor 134 to have a larger effective operation space and to detect the specified position from more angles so as to obtain more comprehensive and accurate detection results.

Detection of a tire of a vehicle using the inspection robot 100 of the embodiment of the present disclosure will be described as an example.

Detection with the conventional inspection robot not only takes a long time but also results in many unreachable areas to be detected, and have low detection efficiency and low detection accuracy. When the inspection robot 100 according to the embodiment of the present disclosure is used for inspection, since the robotic arm 132 is adjustable over a large range (for example, the robotic arm 132 is installed at a position close to the ground, and one end of the robotic arm 132 is extendably connected with the detection sensor 134), the range of positions reachable by the detection sensor 134 is greatly increased, the detection capability of the detection sensor 134 is improved, and the detection sensor 134 may reach detection areas where the conventional inspection robots cannot reach, thus the accuracy of the checking results is greatly improved. The characteristic of the extendable connection of the detection sensor 134 enables it to move linearly to adjust its position to compensate for possible positioning errors between the home position of the robot and the tire in the tire axial direction. When the detection sensor 134 is extended into a gap between the tire and the vehicle body, the extendable arrangement may reduce the mutual interference between the robotic arm 132 and the vehicle body, so that the detection process is performed more smoothly. Moreover, in the detection of double tires (such as the rear tires of a bus, which generally consist of two tires), the extendable arrangement enables the detection sensor 134 to detect the inner tire of the double tires (which can be achieved without changing the travelling position of the robot). Additionally, since the detection sensor 134 and the control cabinet 110 are located on opposite sides, the robotic arm 132 has a very effective operation space, so that the robotic arm 132 can operate closer to the ground. If the robotic arm 132 has a large extension length and the vehicle itself has a smaller width, the inspection robot 100 may complete the detection of all the tires of the vehicle by travelling on only one side of the vehicle, whereby the detection efficiency of the inspection robot 100 is greatly improved. On this basis, the inspection robot 100 of the embodiment of the present disclosure further includes a laser-based wear detection sensor 135 connected with the base 150 via an extendable rod 136, thus the laser-based wear detection sensor 135 may be accurately positioned to the position of each tire of the vehicle by the control cabinet 110. When the inspection robot stops aside the vehicle, the tire to be detected is identified and aligned by a detection signal from the laser-based wear detection sensor 135. Moreover, as shown in FIG. 5, the laser-based wear detection sensor 135 is arranged at a position such that the laser-based wear detection sensor 135 can be extended to and retracted from the lower side of the tire to be detected to measure and record data about the section of the entire tire surface, and the data is calculated in the control cabinet 110 to obtain the remaining tread depth of the tire to be detected, and it is determined, for example, whether the tire is eccentrically worn.

In an embodiment of the present disclosure, an inspection method is disclosed. As shown in FIG. 6, the method includes:

S101 of the actuator 130 moving to a detection area according to a control signal from the control cabinet 110 and performing detection on an object to be detected arranged in the detection area.

Here, the detection area and the object to be detected are not specifically limited in the embodiment of the present disclosure. A corresponding detection area may be preset by those skilled in the art according to the specific form of the object to be detected and the location required to be detected, and the requirements of the corresponding detection area are met by controlling the actuator 130 by the control cabinet 110.

Moreover, it should be noted that in the inspection method of the embodiment of the present disclosure, a detection signal obtained in the detection of the object to be detected may be transmitted to and calculated, stored, and/or outputted in the control cabinet 110, or may be transmitted to and displayed in real time on an external display device, or transmitted to and stored in an external memory or the like, which is not specifically limited in the embodiment of the present disclosure.

Exemplarily, the actuator 130 includes a robotic arm 132 and a detection sensor 134. As shown in FIG. 7, the actuator 130 moving to a detection area according to a control signal from the control cabinet 110 includes:

S1011 of moving a position of the robotic arm 132 according to the control signal from the control cabinet 110, wherein the positional movement includes a linear extension or retraction movement of the robotic arm 132, and/or a movement of the robotic arm 132 in the direction of each of multiple degrees of freedom.

As shown in FIG. 8, the performing detection on the object to be detected arranged in the detection area includes:

S1012 of the detection sensor 134 detecting the object to be detected and sending a detection signal to the control cabinet 110.

When the actuator 130 includes a robotic arm 132 and a detection sensor 134, the robotic arm 132 may move its positional according to a control signal from the control cabinet 110, wherein the positional movement includes a linear extension or retraction movement of the robotic arm 132 which is achieved by an extendable structure, and may also include a movement of the robotic arm 132 in the direction of each of multiple degrees of freedom. The extension or retraction movement and the movement in the directions of multiple degrees of multiple may be performed separately or synchronously.

In addition, the detection sensor 134 is configured to detect the object to be detected and send the detection signal to the control cabinet 110. Therefore, it can be understood that the control cabinet 110 can also compare the detection signal with a preset signal, and perform feedback control of the above-mentioned position adjustment according to a preset corresponding adjustment relation. Here, the preset corresponding adjustment relation may be a formula for calculation of the value of the detection signal, or data tabulated by those skilled in the art based on experience, or the like.

Exemplarily, the base 150 is further provided thereon with a laser-based wear detection sensor 135, wherein the laser-based wear detection sensor 135 is connected with the base 150 via an extendable rod 136. As shown in FIG. 9, the method further includes:

S102 of adjusting a length of extension or retraction of the extendable rod 136 according to a preset signal; and the laser-based wear detection sensor 135 detecting an object to be detected and sending a laser-based wear detection signal to the control cabinet 110.

In the case where the laser-based wear detection sensor 135 is further connected with and arranged on the base 150 via an extendable rod 136, the inspection robot 100 of the embodiment of the present disclosure can also adjust the length of extension or retraction of the extendable rod 136 according to a preset signal to adjust an area or position detectable by the laser-based wear detection sensor 135. A laser-based wear detection signal obtained by detecting the object to be detected by the laser-based wear detection sensor 135 may be transmitted to and displayed, calculated, and/or stored in the control cabinet 110.

It should be noted that the above-mentioned preset signal may be a signal preset in the control cabinet 110 or a signal calculated by the control cabinet 110 according to the detection signal from the laser-based wear detection sensor 135. In other words, the control cabinet 110 may perform feedback control of the adjustment of the extension or retraction of the extendable rod 136 according to the detection signal from the laser-based wear detection sensor 135 to adjust the area or position detectable by the laser-based wear detection sensor 135.

Exemplarily, the base 150 is provided with a travelling wheel set 152 and an electric motor. As shown in FIG. 10, allowing the actuator 130 to move to a detection area according to a control signal from the control cabinet 110 further includes:

S1011' of controlling an operation of the electric motor to drive rolling of the travelling wheel set 152.

The base 150 is provided with a travelling wheel set 152 and an electric motor, wherein rolling of the travelling wheel set 152 may also be controlled by the control cabinet 110.

The above description is merely illustrative of optional embodiments of the present disclosure and is not intended to limit the present disclosure. It will be understood by those skilled in the art that various modifications and variations can be made to the present disclosure. Any modifications, equivalent alternatives, improvements and so on made within the spirit and principle of the present disclosure are to be included in the scope of protection of the present disclosure.

INDUSTRIAL APPLICABILITY

In summary, the present disclosure provides an inspection robot and an inspection method, in which a robotic arm can be adjusted and extended or retracted in multiple directions, so that the robotic arm can effectively operate over a larger space range so as to expand an area detectable by a detection sensor and improve the detection capability of the detection sensor, and in which the state of wear of the surface of an object to be detected can also be detected by a laser-based wear detection sensor arranged via an extendable rod. The inspection robot and the inspection method are applicable to vehicle detection and to the detection of various objects to be detected with different specifications and detection requirements.

What is claimed is:

1. An inspection robot, comprising a control cabinet, an actuator, and a base, wherein the control cabinet and the actuator are oppositely arranged on the base in a direction parallel to a plane where the base is located, the control cabinet is configured to control a path of movement of the actuator, and the actuator and the control cabinet are respectively located on two sides of a travelling direction of the inspection robot.

2. The inspection robot according to claim 1, wherein the actuator comprises a robotic arm and a detection sensor, the robotic arm has one end connected with the base and the other end extendably connected with the detection sensor, and the robotic arm and the detection sensor are in signal connection with the control cabinet, respectively.

3. The inspection robot according to claim 2, wherein the robotic arm is an extendable arm and the robotic arm is linearly extended or retracted in a direction, in which the two ends of the robotic arm are connected, according to a control signal from the control cabinet.

4. The inspection robot according to claim 3, wherein said other end of the robotic arm is connected with the detection sensor via an extendable member, and the extendable member is in signal connection with the control cabinet.

5. The inspection robot according to claim 4, wherein the robotic arm has six degrees of freedom.

6. The inspection robot according to claim 3, wherein the robotic arm has six degrees of freedom.

7. The inspection robot according to claim 2, wherein the robotic arm has six degrees of freedom.

8. The inspection robot according to claim 1, wherein the base is further provided with a laser-based wear detection sensor, the laser-based wear detection sensor is connected with the base via an extendable rod, and the extendable rod and the laser-based wear detection sensor are in signal connection with the control cabinet, respectively.

9. The inspection robot according to claim 1, wherein the base is provided with a travelling wheel set and an electric motor, and the electric motor is in signal connection with the control cabinet and configured to drive the travelling wheel set to rotate according to a control signal from the control cabinet.

10. The inspection robot according to claim 9, wherein the travelling wheel set comprises driving wheels and driven wheels, the electric motor drives the driving wheels to rotate, and each driven wheel is a universal wheel.

11. The inspection robot according to claim 10, wherein a clump weight is arranged between each driven wheel and a connection plate of the base.

12. The inspection robot according to claim 9, wherein elastic members are arranged between the travelling wheel set and the base.

13. The inspection robot according to claim 1, wherein the control cabinet is detachably connected with the base.

14. The inspection robot according to claim 1, wherein the control cabinet is connected with the base by a support column, the support column has an end provided with a first threaded hole and the other end provided with a second threaded hole, respectively, the first threaded hole is threaded to match a first bolt of the control cabinet, and the second threaded hole is threaded to match a second bolt of the base.

15. An inspection method, comprising steps of:
an actuator moving to a detection area according to a control signal from a control cabinet and performing detection on an object to be detected arranged in the detection area,
wherein the control cabinet and the actuator are oppositely arranged on a base in a direction parallel to a plane where the base is located; and
wherein the actuator and the control cabinet are respectively located on two sides of a travelling direction of an inspection robot performing the inspection.

16. The inspection method according to claim 15, wherein the actuator comprises a robotic arm and a detection sensor, and the step of an actuator moving to a detection area according to a control signal from a control cabinet comprises:
moving a position of the robotic arm according to the control signal from the control cabinet, wherein the positional movement comprises a linear extension or retraction movement of the robotic arm, and/or a movement of the robotic arm in a direction of each of multiple degrees of freedom; and
the step of performing detection on an object to be detected arranged in the detection area comprises:
the detection sensor detecting the object to be detected and sending a detection signal to the control cabinet.

17. The inspection method according to claim 15, wherein a base is further provided with a laser-based wear detection sensor, the laser-based wear detection sensor is connected with the base via an extendable rod, and the method further comprises:
adjusting a length of extension or retraction of the extendable rod according to a preset signal; and
the laser-based wear detection sensor detecting an object to be detected and sending a laser-based wear detection signal to the control cabinet.

18. The inspection method according to claim 15, wherein the base is provided with a travelling wheel set and an electric motor, and the step of the actuator moving to a detection area according to a control signal from the control cabinet further comprises:
controlling an operation of the electric motor to drive the travelling wheel set to rotate.

19. The inspection robot according to claim 1, wherein the base is further provided with a laser-based wear detection sensor, the laser-based wear detection sensor is connected with the base via an extendable rod, and the extendable rod and the laser-based wear detection sensor are in signal connection with the control cabinet, respectively.

* * * * *